3,502,674
THIOL-TYPE THIAMINE THIONOCARBONATES
Akira Takamizawa, Osaka Prefecture, and Yoshio Hamashima, Kyoto Prefecture, Japan, assignors to Shionogi & Co., Ltd., Osaka, Japan
No Drawing. Filed Oct. 26, 1967, Ser. No. 678,200
Claims priority, application Japan, Nov. 2, 1966, 41/72,530
Int. Cl. C07d 51/42
U.S. Cl. 260—256.5                16 Claims

ABSTRACT OF THE DISCLOSURE

S-substituted or unsubstituted phenoxythionocarbonylthiamines being prepared by an interaction of an alkali metal salt of thiol-type thiamine with a substituted or unsubstituted phenoxythionocarbonyl group introducing agent, and possessing anti-inflammatory activity and also rapid, prolonged and high level vitamin $B_1$ activity.

---

This invention relates to thiol-type thiamine thionocarbonates and production thereof. More particularly, the present invention relates to S-substituted or unsubstituted phenoxythionocarbonylthiamines and production thereof. The said S-substituted or unsubstituted phenoxythionocarbonylthiamines are representable by the formula:

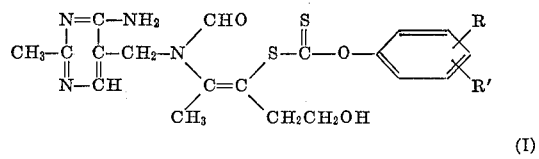

(I)

wherein each R and R' is independently a member selected from the group consisting of hydrogen, lower alkyl, lower alkenyl, lower alkoxy and halogen. These compounds show marked anti-inflammatory activity and are useful as medicaments.

Accordingly, a fundamental object of the present invention is to embody novel thiol-type thiamine thionocarbonates and process for preparation thereof. Another object of the invention is to embody thiol-type thiamine thionocarbonates being useful as anti-inflammatory agents. A further object of the invention is to embody pharmaceutical compositions comprising thiol-type thiamine thionocarbonates being suited to the treatment of inflammation, edema or vitamin $B_1$ deficiency. These and other objects of the invention will be apparent to those conversant with the art to which the present invention pertains from the subsequent description.

Thiol-type thiamine thionocarbonates of the Formula I are prepared by the interaction of alkali metal salts of thiol-type thiamine represented by the formula:

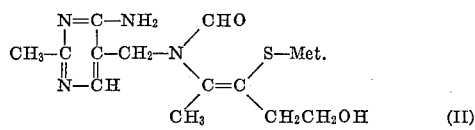

(II)

wherein Met. is an alkali metal (e.g. sodium, potassium) with substituted or unsubstituted phenoxythionocarbonyl group introducing agents represented by the formula:

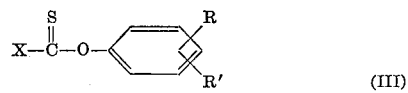

(III)

wherein X is a halogen atom (e.g. chlorine, bromine) and R and R' have the same significances as designated above.

The starting compounds, alkali metal salts of thiol-type thiamine of the Formula II, may be prepared by reacting thiamine chloride hydrochloride with alkaline substances such as alkali metal, alkali metal hydroxide and alkali metal alkoxide according to a conventional manner. For instance, the sodium salt of thiol-type thiamine is prepared by treating thiamine chloride hydrochloride with three molar amounts of sodium alkoxide in a lower alkanol at room temperature (15 to 20° C.). Although the production of thiol-type thiamine thionocarbonates (I) is illustrated independently below, it may be carried out subsequent to the preparation of the alkali metal salts of thiol-type thiamine (II) without isolation of the latter.

On the other hand, the reagents, i.e. substituted or unsubstituted phenoxythionocarbonyl group introducing agents of the Formula III, are substituted or unsubstituted phenyl halogenothionocarbonates. As illustrative of the said reagents are phenyl halogenothionocarbonates,
2-tolyl halogenothionocarbonates,
3-tolyl halogenothionocarbonates,
4-tolyl halogenothionocarbonates,
2-ethylphenyl halogenothionocarbonates,
3-propylphenyl halogenothionocarbonates,
4-butylphenyl halogenothionocarbonates,
2,4-xylyl halogenothionocarbonates,
3,4-xylyl halogenothionocarbonates,
3,5-xylyl halogenothionocarbonates,
2-methyl-4-ethylphenyl halogenothionocarbonates,
2-ethyl-4-butylphenyl halogenothionocarbonates,
3-propyl-5-methylphenyl halogenothionocarbonates,
2-methoxyphenyl halogenothionocarbonates,
3-methoxyphenyl halogenothionocarbonates,
4-methoxyphenyl halogenothionocarbonates,
4-butoxyphenyl halogenothionocarbonates,
2-propoxy-4-ethylphenyl halogenothionocarbonates,
2-allylphenyl halogenothionocarbonates,
4-allylphenyl halogenothionocarbonates,
2-,1-propenyl)-phenyl halogenothionocarbonates,
4-(1-butenyl)-phenyl halogenothionocarbonates,
2-methoxy-4-allylphenyl halogenothionocarbonates,
2-methoxy-4-(1-propenyl)-phenyl halogenothionocarbonates,
2-chlorophenyl halogenothionocarbonates,
2-bromophenyl halogenothionocarbonates,
4-bromophenyl halogenothionocarbonates,
2,4-dichlorophenyl halogenothionocarbonates,
2,4-dibromophenyl halogenothionocarbonates,
3,4-dibromophenyl halogenothionocarbonates,
2-chloro-4-methoxyphenyl halogenothionocarbonates,
2-butyl-4-bromophenyl halogenothionocarbonates and the like.

According to the present invention, the production of the objective compound (I) can be accomplished by treating an alkali metal salt of thiol-type thiamine (II) with an approximately equimolar amount of the said reagent (III) in an inert solvent such as water, lower alkanol (e.g. methanol, ethanol), halogeno(lower)alkane (e.g. chloroform, dichloromethane), lower alkanone (e.g. acetone, methylethylketone), dioxane, tetrahydrofuran, benzene and the mixture thereof at a temperature from about $-50°$ C. to a reflux temperature of the reaction medium, preferably $-30°$ C. to 20° C. In general, it is recommended to isolate and purify the thus produced thiol-type thiamine thionocarbonate (I) as the acid addition salt such as hydrochloride and hydrobromide. If necessary, conversion of the thus purified acid addition salt into the free base may be achieved by a per se conventional manner.

Specific examples of the thiol-type thiamine thionocarbonates (I) prepared by the process of the present invention are
S-phenoxythionocarbonylthiamine,
S-(2-tolyloxythionocarbonyl)-thiamine,
S-(3-tolyloxythionocarbonyl)-thiamine,
S-(4-tolyloxythionocarbonyl)-thiamine,
S-(2-ethylphenoxythioncarbonyl-thiamine,
S-(3-propylphenoxythionocarbonyl)-thiamine,
S-(4-butylphenoxythionocarbonyl)-thiamine,
S-(2,4-xylyloxythionocarbonyl)-thiamine,
S-(3,4-xylyloxythionocarbonyl)-thiamine,
S-(3,5-xylyloxythionocarbonyl)-thiamine,
S-(2-methyl-4-ethylphenoxythionocarbonyl)-thiamine,
S-(2-ethyl-4-butylphenoxythionocarbonyl)-thiamine,
S-(3-propyl-5-methylphenoxythionocarbonyl)-thiamine,
S-(2-methoxyphenoxythionocarbonyl)-thiamine,
S-(3-methoxyphenoxythionocarbonyl)-thiamine,
S-(4-methoxyphenoxythionocarbonyl)-thiamine,
S-(4-butoxyphenoxythionocarbonyl)-thiamine,
S-(2-propoxy-4-ethylphenoxythionocarbonyl)-thiamine,
S-(2-allylphenoxythionocarbonyl)-thiamine,
S-(4-allylphenoxythionocarbonyl)-thiamine,
S-[2-(1-propenyl)-phenoxythionocarbonyl]-thiamine,
S-[4-(1-butenyl)-phenoxythionocarbonyl]-thiamine,
S-(2-methoxy-4-allylphenoxythionocarbonyl)-thiamine,
S-[2-methoxy-4-(1-propenyl)-phenoxythionocarbonyl]-thiamine,
S-(2-chlorophenoxythionocarbonyl)-thiamine,
S-(2-bromophenoxythionocarbonyl)-thiamine,
S-(4-bromophenoxythionocarbonyl)-thiamine,
S-(2,4-dichlorophenoxythionocarbonyl)-thiamine,
S-(2,4-dibromophenoxythionocarbonyl)-thiamine,
S-(3,4-dibromophenoxythionocarbonyl)-thiamine,
S-(2-chloro-4-methoxyphenoxythionocarbonyl)-thiamine,
S-(2-butyl-4-bromophenoxythionocarbonyl)-thiamine
and the like.

These thiol-type thiamine thionocarbonates (I) and non-toxic acid addition salts thereof possess anti-inflammatory activity and also show rapid, prolonged and high level vitamin $B_1$ activity.

To examine the anti-inflammatory activity of these compounds (I), the inhibition percentages of edema produced by a subcutaneous injection of 1% carrageenin (0.05 ml.) in the rat hind paw were determined, when the test animals were orally pre-treated with a dose of 100 mg./kg. of the compounds. The results in some typical compounds are listed in the following table in contrast with a commercially available anti-inflammatory agent, phenylbutazone. From the table, it is apparent that the anti-inflammatory activities of the compounds (I) are significantly superior to that of the known phenylbutazone. Further, these compounds (I) are also characteristic in low toxicity. For instance, the median lethal dose ($LD_{50}$) of S-phenoxythiocarbonylthiamine hydrochloride monohydrate was found to be 150 mg./kg. subcutaneously and 799.8 mg./kg. orally in mice.

TABLE.—ANTI-INFLAMMATORY ACTIVITY IN WISTAR RATS

| Test compound: | Inhibition percentage |
|---|---|
| S-phenoxythionocarbonylthiamine hydrochloride monohydrate | 50.0 |
| S-(3-tolyloxythionocarbonyl)-thiamine hydrochloride | 43.4 |
| S-(4-tolyloxythionocarbonyl)-thiamine hydrochloride | 62.6 |
| S-(2,4-xylyloxythionocarbonyl)-thiamine hydrochloride | 46.4 |
| S-(3,4-xylyloxythionocarbonyl)-thiamine hydrochloride | 46.1 |
| S-(3,5-xylyloxythionocarbonyl)-thiamine hydrochloride | 53.7 |
| Phenylbutazone, a commercially available agent | 32.0 |

The thiol-type thiamine thionocarbonates (I) are administered in dosage unit form, as carried by a suitable pharmaceutical carrier, to human beings particularly for treatment of inflammation, edema and vitamin $B_1$ deficiency. Normally the preparation is orally administered, although those likewise are effective when otherwise administered. Those may be administered in various dosages such as 10, 20, 30, 50, 100, 150, 200 or 300 milligrams, although the unit dosage range may vary more broadly from about 5 to about 500 milligrams and preferably from about 10 to about 300 milligrams. Those may be added to or otherwise used with various pharmaceutical carriers. By way of exemplification, various solid carriers may be employed such as lactose, mannitol, corn starch, talc and magnesium stearate as well as other tableting aids and fillers. If desired, some other ingredients such as riboflavin, pyridoxin, folic acid, biotin, inositol, mineral salts and the like may be mixed with the said active ingredients. The medicinal mixture may then be tableted or encapsulated in a hard gelatine capsule, depending on the commercial unit form desired. Ordinarily tableting is preferred. The amount of carrier or diluent may vary, according to tablet size desired or whether the dosage is made up in encapsulated form, from zero amount to the maximum amount consistent with the practical limits of bulk for a dosage unit. Normally the carrier with which the medicament is mixed does not exceed about 300 to 500 milligrams.

The following examples illustrate methods of carrying out the present invention, but it is to be understood that these examples are given for purpose of illustration only and not of limitation. In the examples which follow, parts by weight bear the same relation to parts by volume as do grams to millilitres. The temperatures are set forth in degree centigrade. The abbreviations have conventional significances.

EXAMPLE 1

Preparation of S-phenoxythionocarbonylthiamine:

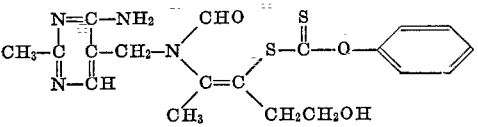

To a suspension of sodium salt of thiol-type thiamine (4.25 parts by weight) in absolute ethanol (25 parts by volume) is dropwise added phenyl chlorothionocarbonate (1.72 parts by weight) at −20° C. with stirring. The reaction mixture is stirred at the same temperature for 1 hour, acidified by addition of 5% ethanolic hydrochloric acid, and evaporated under reduced pressure. The residue is recrystallized from ethanol or aqueous ethanol to give S-phenoxythionocarbonylthiamine hydrochloride monohydrate (4.37 parts by weight) as colorless needles, M.P. 170° C. (decompd.).

IR: $\nu_{max}^{Nujol}$ cm.$^{-1}$: 3250, 3228, 3078, 1676, 1644, 1608, 1193, 1181, 1028

Analysis.—Calcd. for $C_{19}H_{22}N_4S_2O_3 \cdot HCl \cdot H_2O$ (percent): C, 48.24; H, 5.33; N, 11.85; S, 13.56; Cl, 7.49. Found (percent): C, 47.72; H, 5.60; N, 11.20; S, 12.88; Cl. 8.26.

EXAMPLE 2

Preparation of S-(2-tolyloxythionocarbonyl)-thiamine:

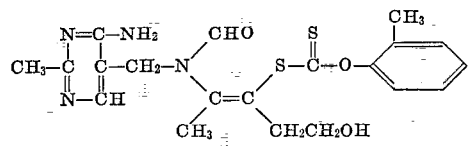

To a suspension of sodium salt of thio-type thiamine (9.5 parts by weight) in absolute ethanol (80 parts by volume) is dropwise added 2-tolyl chlorothionocarbonate (3.74 parts by weight) at —20— —30° C. with stirring. The reaction mixture is stirred at the same temperature for 1 hour, acidified to pH 2.0 by addition of 10% ethanolic hydrochloric acid, and evaporated under reduced pressure. The residue is washed with cold acetone and recrystallized from aqueous ethanol to give S-(2-tolyloxythionocarbonyl)-thiamine hydrochloride (8.03 parts by weight), M.P. 147–149° C. (decompd.).

*Analysis.*—Calcd. for $C_{20}H_{24}N_4S_2O_3 \cdot HCl$ (percent): C, 51.21; H, 5.37; N, 11.95. Found (percent): C, 50.75; H, 5.68; N, 11.37.

EXAMPLE 3

Preparation of S-(3-tolyloxythionocarbonyl)-thiamine:

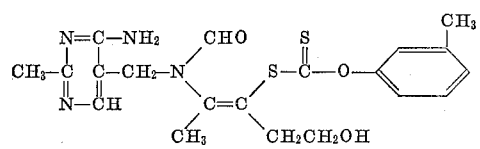

To a suspension of sodium salt of thiol-type thiamine (4.25 parts by weight) in absolute ethanol (50 parts by volume) is dropwise added 3-tolyl chlorothionocarbonate (1.87 parts) by weight) at —20— —10° C. with stirring. The reaction mixture is stirred for 2 hours, acidified to pH 3.0 by addition of 10% ethanolic hydrochloric acid, and evaporated under reduced pressure. The residue is recrystallized from aqueous ethanol to give S-(3-tolyloxythionocarbonyl)-thiamine hydrochloride (3.95 parts by weight), M.P. 170–172° C. (decompd.).

*Analysis.*—Calcd. for $C_{20}H_{24}N_4S_2O_3 \cdot HCl$ (percent): C, 51.21; H, 5.37; N, 11.95. Found (percent): C, 51.00; H, 5.23; N, 11.94

EXAMPLE 4

Preparation of S-(4-tolyloxythionocarbonyl)-thiamine:

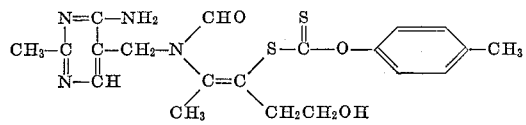

In a similar manner to the foregoing examples, sodium salt of thiol-type thiamide (9.5 parts by weight) is made to react with 4-tolyl chlorothionocarbonate (3.74 parts by weight) in absolute ethanol (100 parts by volume). The crude product is recrystallized from aqueous ethanol to give S-(4-tolyloxythionocarbonyl)-thiamine hydrochloride (8.44 parts by weight), M.P. 173–175° C. (decompd.).

*Analysis.*—Calc'd. for $C_{20}H_{24}N_4S_2O_3 \cdot HCL$ (percent): C, 51.21; H, 5.37; N, 11.95. Found (percent): C, 51.10; H, 5.24; N, 11.97.

EXAMPLE 5

Preparation of S-(2,4-xylyloxythionocarbonyl)-thiamine:

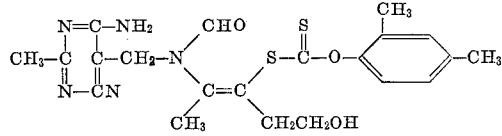

In a similar manner to the foregoing examples, sodium salt of thiol-type thiamine (9.5 parts by weight) is made to react with 2,4-xylyl chlorothionocarbonate (4 parts by weight) in absolute ethanol (85 parts by volume). The crude product is recrystallized from aqueous ethanol to give S-(2,4-xylyloxythionocarbonyl)-thiamine hydrochloride (6.8 parts by weight), M.P. 162.5–166° C. decompd.).

*Analysis.*—Calc'd. for $C_{21}H_{26}N_4S_2O_3 \cdot HCl$ (percent): C, 52.21; H, 5.43; N, 11.60. Found (percent): C, 51.87; H, 5.58; N, 11.87.

EXAMPLE 6

Preparation of S-(3,4-xylyloxythionocarbonyl)-thiamine:

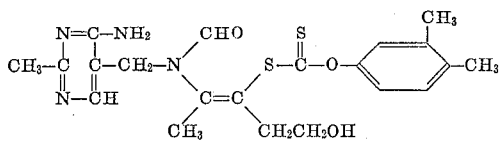

In a similar manner to the foregoing examples, sodium salt of thiol-type thiamine (9.5 parts by weight) is made to react with 3,4-xylyl chlorothionocarbonate (4 parts by weight) in absolute ethanol (85 parts by volume). The crude product is recrystallized from aqueous ethanol to give S-(3,4-xylyloxythionocarbonyl)-thiamine hydrochloride (9.1 parts by weight, M.P. 173–176° C. (decompd.).

*Analysis.*—Cal'd. for $C_{21}H_{26}N_4S_2O_3 \cdot HCl$ (percent): C, 52.21; H, 5.43; N, 11.60. Found (percent): C, 51.76; H, 5.65; N, 11.63.

EXAMPLE 7

Preparation of S-(3,5-xylyloxythionocarbonyl)-thiamine:

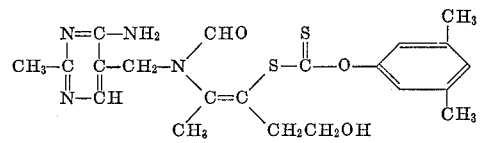

In a similar manner to the foregoing examples, sodium salt of thiol-type thiamine (9.5 parts by weight) is made to react with 3,5-xylyl chlorothionocarbonate (4 parts by weight) in absolute ethanol (80 parts by volume). The crude product is recrystallized from aqueous ethanol to give S-(3,5-xylyloxythionocarbonyl)-thiamine hydrochloride (9.05 parts by weight), M.P. 166–1685 C. (decompd.).

EXAMPLE 8

Preparation of S-(2-methoxyphenoxythionocarbonyl)-thiamine:

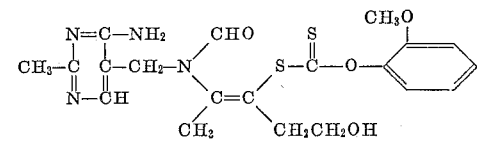

In a similar manner to the foregoing examples, sodium salt of thiol-type thiamine (8.6 parts by weight) is made to react with 2-methoxyphenyl chlorothionocarbonate (4.1 parts by weight) in absolute ethanol (80 parts by volume). The crude product is recrystallized from aqueous ethanol to give S-(2-methoxyphenoxythionocarbonyl)-thiamine hydrochloride (7 parts by weight), M.P. 173–175° C. (decompd.).

*Analysis.*—Calc'd. for $C_{20}H_{24}N_4S_2O_4 \cdot HCl$ (percent): C, 49.53; H, 5.20; N, 11.55. Found (percent): C, 49.46; H, 5.38; N, 12.23.

EXAMPLE 9

Preparation of S-(4-methoxyphenoxythionocarbonyl)-thiamine:

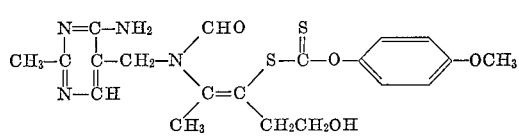

In a similar manner to the foregoing example, sodium salt of thiol-type thiamine (12.64 parts by weight) is made to react with 4-methoxyphenyl chlorothionocarbonate (5.8 parts by weight) in absolute ethanol (70 parts by volume). The crude product is recrystallized from aqueous ethanol to give S-(4-methoxyphenoxythionocarbonyl)-thiamine hydrochloride (14.7 parts by weight), M.P. 176–177° C. (decompd.).

*Analysis.*—Calc'd for $C_{20}H_{24}N_4S_2O_4 \cdot HCl$ (percent): C, 49.53– H, 5.20; N, 11.55. Found (percent): C, 49.68; H, 5.23; N, 11.63.

EXAMPLE 10

Preparation of S-(2-methoxy-4-allylphenoxythionocarbonyl)-thiamine:

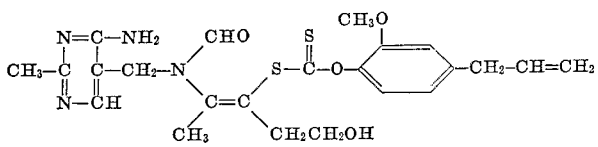

In a similar manner to the foregoing examples, sodium salt of thiol-type thiamine (8.82 parts parts by weight) is made to react with 2-methoxy-4-allylphenyl chlorothionocarbonate (4.5 parts by weight) in absolute ethanol (50 parts by volume). The crude product was recrystallized from aqueous ethanol to give S-(2-methoxy-4-allylphenoxythionocarbonyl)-thiamine hydrochloride monohydrate (9.1 parts by weight), M.P. 158.5–160° C. (decompd.).

*Analysis.*—Calc'd for $C_{23}H_{28}N_4S_2O_4 \cdot HCl \cdot H_2O$ (percent) C, 50.86; H, 5.75; N, 10.32. Found (percent): C, 51.71; H, 5.96; N, 9.80.

EXAMPLE 11

Preparation of S-[2-methoxy-4-(1-propenyl)-phenoxythionocarbonyl]-thiamine:

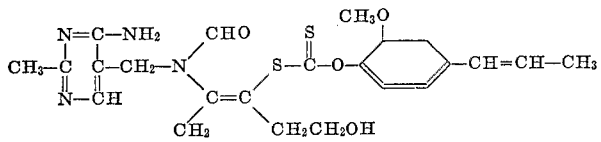

In a similar manner to the foregoing examples, sodium salt of thiol-type thiamine (10.6 parts by weight) is made to react with 2-methoxy-4-(1-propenyl)-phenyl chlorothionocarbonate (5.4 parts by weight) in absolute ethanol (80 parts by volume). The crude product is recrystallized from aqueous ethanol to give S-[2-methoxy - 4 - (1 - propenyl)-phenoxythionocarbonyl]-thiamine hydrochloride monohydrate (10.75 parts by weight), M.P. 138–141° C. (decompd.).

*Analysis.*—Calc'd for $C_{23}H_{28}N_4S_2O_4 \cdot HCl \cdot H_2O$ (percent): C, 50.86; H, 5.75; N, 10.32. Found (percent): C, 50.80; H, 5.80; N, 9.80.

EXAMPLE 12

Preparation of S-(2-bromophenoxythionocarbonyl)-thiamine:

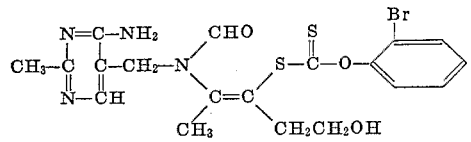

In a similar manner to the foregoing examples, sodium salt of thiol-type thiamine (4.54 parts by weight) is made to react with 2-bromophenyl chlorothionocarbonate (2.7 parts by weight) in absolute ethanol (40 parts by volume). The crude product is recrystallized from aqueous ethanol to give S-(2-bromophenoxythionocarbonyl)-thiamine hydrochloride (5.6 parts by weight), M.P. 163–167° C. (decompd.).

EXAMPLE 13

Preparation of S-(4-bromophenoxythionocarbonyl)-thiamine:

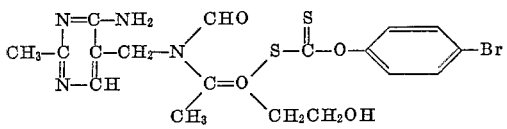

In a similar manner to the foregoing examples, sodium salt of thiol-type thiamine (5.31 parts by weight) is made to react with 4-bromophenyl chlorothionocarbonate (3.15 parts by weight) in absolute ethanol (80 parts by volume). The crude product is recrystallized from aqueous ethanol to give S-(4-bromophenoxythionocarbonyl)-thiamine hydrochloride (4.75 parts by weight), M.P. 161–163° C. (decompd.).

*Analysis.*—Calc'd for $C_{19}H_{22}N_4S_2O_3Br \cdot HCl$ (percent): C, 42.66; H, 4.15; N, 10.47. Found (percent): C, 42.57; H, 3.96; N, 10.87.

EXAMPLE 14

Preparation of S-(2,4-dichlorophenoxythionocarbonyl)-

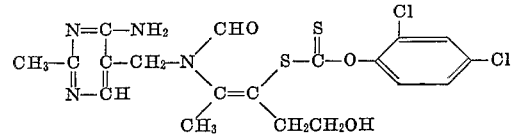

In a similar manner to the foregoing examples, sodium salt of thiol-type thiamine (8.97 parts by weight) is made to react with 2,4-dichlorophenyl chlorothionocarbonate (5.1 parts by weight) in absolute ethanol (60 parts by volume). The crude product is recrystallized from aqueous ethanol to give S-(2,4-dichlorophenoxythionocarbonyl)-thiamine hydrochloride (18 parts by weight), M.P. 148° (decompd.).

EXAMPLE 15

Preparation of S - (2,4 - dibromophenoxythionocarbonyl)-thiamine:

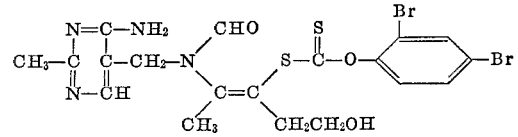

In a similar manner to the foregoing examples, sodium salt of thiol-type thiamine (13.3 parts by weight) is made to react with 2,4-dibromophenyl chlorothionocarbonate (9.95 parts by weight) in absolute ethanol (80 parts by volume). The crude product is recrystallized from aqueous ethanol to give S-(2,4-dibromophenoxythionocarbonyl)-thiamine hydrochloride (10.1 parts by weight), M.P. 160–161° C. (decompd.).

*Analysis.*—Calc'd for $C_{19}H_{20}N_4S_2O_3Br_2 \cdot HCl$ (percent): C, 37.23; H, 3.45; N, 9.15. Found (percent): C, 37.30; H, 3.50; N, 9.22.

What is claimed is:

1. A member selected from the group consisting of compounds of the formula:

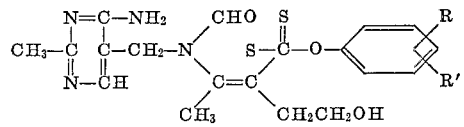

wherein each R and R' is independently a member selected from the group consisting of hydrogen, lower alkyl, lower alkenyl, lower alkoxy and halogen.

2. A compound according to claim 1, namely S-phenoxythionocarbonylthiamine.

3. A compound according to claim 1, namely S-(2-tolyloxythionocarbonyl)-thiamine.

4. A compound according to claim 1, namely S-(3-tolyloxythionocarbonyl)-thiamine.

5. A compound according to claim 1, namely S-(4-tolyloxythionocarbonyl)-thiamine.

6. A compound according to claim 1, namely S-(2,4-xylyloxythionocarbonyl)-thiamine.

7. A compound according to claim 1, namely S-(3,4-xylyloxythionocarbonyl)-thiamine.

8. A compound according to claim 1, namely S-(3,5-xylyloxythionocarbonyl)-thiamine.

9. A compound according to claim 1, namely S-(2-methoxyphenoxythionocarbonyl)-thiamine.

10. A compound according to claim 1, namely S-(4-methoxyphenoxythionocarbonyl)-thiamine.

11. A compound according to claim 1, namely S-(2-methoxy-4-allylphenoxythionocarbonyl)-thiamine.

12. A compound according to claim 1, namely S-[2-methoxy - 4(1 - propenyl)-phenoxythionocarbonyl]-thiamine.

13. A compound according to claim 1, namely S-(2-bromophenoxythionocarbonyl)-thiamine.

14. A compound according to claim 1, namely S-(4-bromophenoxythionocarbonyl)-thiamine.

15. A compound according to claim 1, namely S-2,4-dichlorophenoxythionocarbonyl)-thiamine.

16. A compound according to claim 1, namely S-(2,4-dibromophenoxythionocarbonyl)-thiamine.

References Cited

FOREIGN PATENTS 20,166    1964    Japan.

ALEX MAZEL, Primary Examiner

R. J. GALLAGHER, Assistant Examiner

U.S. Cl. X.R.

424—255